United States Patent [19]
Pilling et al.

[11] Patent Number: 6,049,960
[45] Date of Patent: *Apr. 18, 2000

[54] METHOD AND DEVICE FOR SLIDING AND POSITIONING SLEEVE-SHAPED ELASTIC COMPONENTS ON CYLINDRICAL OR CONICAL BASE BODIES

[75] Inventors: Jürgen Pilling, Spitzkunnersdorf; Klaus-Dieter Haim; Jens Weichold, both of Zittau; Ralf Rotzsche, Radebeul, all of Germany

[73] Assignee: Zittauer Kunststoff GmbH, Zittau, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/913,645
[22] PCT Filed: Mar. 22, 1996
[86] PCT No.: PCT/DE96/00490
§ 371 Date: Sep. 16, 1997
§ 102(e) Date: Sep. 16, 1997
[87] PCT Pub. No.: WO96/29767
PCT Pub. Date: Sep. 26, 1996

[30] Foreign Application Priority Data

Mar. 23, 1995 [DE] Germany .................. 195 10 598

[51] Int. Cl.⁷ .................................................. B23P 11/02
[52] U.S. Cl. ............................................. 29/450; 29/235
[58] Field of Search ................... 29/235, 450, 745

[56] References Cited

U.S. PATENT DOCUMENTS

| | | |
|---|---|---|
| 2,038,840 | 4/1936 | Hall ............................................. 29/235 |
| 2,830,361 | 4/1958 | Bruner ........................................ 29/235 |
| 3,275,490 | 9/1966 | Stoddart . | |
| 3,946,480 | 3/1976 | Dienes . | |
| 3,992,570 | 11/1976 | Beinhaur ................................... 29/450 |
| 4,553,300 | 11/1985 | Mancha . | |
| 4,581,481 | 4/1986 | Moretti ....................................... 29/235 |
| 5,074,023 | 12/1991 | Decker et al. ............................ 29/235 |
| 5,685,052 | 11/1997 | Meyers et al. ............................ 29/235 |

FOREIGN PATENT DOCUMENTS

| | | |
|---|---|---|
| 2685564 | 6/1993 | France . |
| 474991 | 3/1929 | Germany . |
| 1073568 | 1/1960 | Germany . |
| 88 13 932 | 11/1988 | United Kingdom . |
| 89/00782 | 1/1989 | WIPO . |
| 94/20259 | 9/1994 | WIPO . |

*Primary Examiner*—David P. Bryant
*Assistant Examiner*—Jermie E. Cozart
*Attorney, Agent, or Firm*—Henry M. Feiereisen

[57] ABSTRACT

The invention concerns a method and device for sliding and positioning sleeve-shaped elastic radially expandable components (8), made of a highly elastic material, without exerting great force, on cylindrical or conical base bodies (10) having an outer diameter which is greater than the inner diameter of these sleeve-shaped components (8), such as e.g. parts of a cable fitting set mounted and positioned on a cable end prepared in a manner known per se for a cable terminal or cable connection. Immediately before the component is placed onto the base body (10), a plurality of elongated, thin, flexible rib-like sliding tongues (2) in spaced-apart circumferential disposition is inserted in the cavity of the component (8) which has an approximately circular cross section. The sliding tongues (2) are inserted at slight lateral spacing from one another. On these sliding tongues (2) the expanding component (8) is pushed slidingly onto the base body (10) with only slight exertion of force. The sliding tongues (2) are then withdrawn. A sliding sleeve is used to fit the component onto the base body, and includes a transverse band (1) which forms a spacer or partial ring collar and connects a plurality of laterally mutually spaced, elongated, thin, flexible rib-like sliding tongues (2) made of a material which displays high sliding capability compared to the material of the base body (10).

14 Claims, 3 Drawing Sheets

FIG. 1A
FIG. 1B
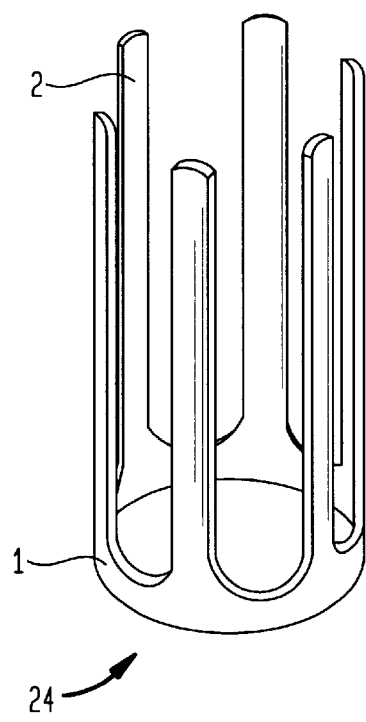
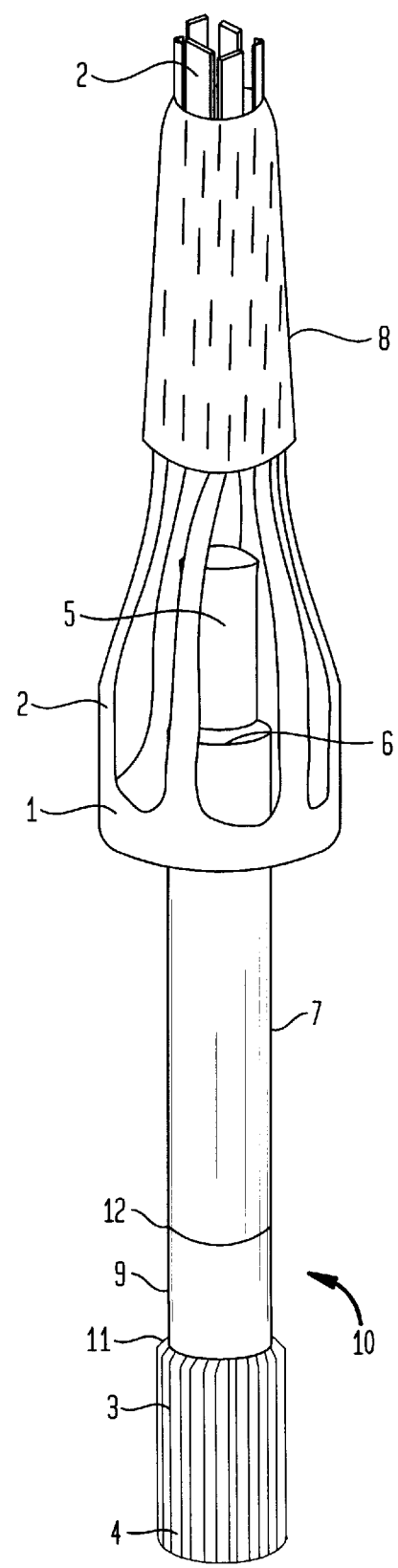

METHOD AND DEVICE FOR SLIDING AND POSITIONING SLEEVE-SHAPED ELASTIC COMPONENTS ON CYLINDRICAL OR CONICAL BASE BODIES

BACKGROUND OF THE INVENTION

The invention relates to a method and a device for sliding and positioning sleeve-shaped, elastic, radially expandable components on cylindrical or conical base bodies having a smallest outer diameter to be covered or enclosed which is greater than the non-expanded inner diameter of the sleeve-shaped component to be mounted. Preferably, the invention has as objective to slide such radially expandable, sleeve-shaped components on base bodies made from insulated cable wires or cable wire bundles prepared in a manner known per se.

An important field of application of the method according to the invention and of the device for implementing the method thus includes to slide and position components of cable fittings on base bodies in the form of cable ends or cable connections which have been prepared in a manner known per se for making insulated cable connections for single-conductor and three-conductor plastic cables carrying nominal voltages of about 30 kV.

Upon application of the method in the cable connection technique and cable insulation technique, the preferably employed, conventional expandable sleeve-shaped components are made for example from silicone rubber or EPDM and can be modified, depending on the application, with fillers in order to effect e.g. a field control or to increase the leakage current resistance. In particular, these components can also be constructed of several elastic layers, e.g. layers having a different conductivity and/or dielectric constant, and are used for assembling cable fittings, i.e. for providing an insulation at the ends of a cable in conjunction with cable terminations, cable plugs, as cable end caps, or as cable sleeves for insulation at the point of connection between two cable ends, and thus form part of a cable fitting set.

In these cases, the base body to be enclosed is an insulated cable wire or an insulated cable wire bundle, preferably from plastic cables with polyethylene insulation, with the outer sheath, including the so-called outer conductor layer, being removed, as is customary when the cable fittings are installed. If necessary, prior to sliding and positioning of the elastically expandable sleeve-shaped component, the insulating layer of the cable is provided with an enveloping layer which forms e.g. a barrier against escape of cable mass in paper insulated mass-impregnated cables.

Conventionally, when the sleeve-shaped components are fitted over and positioned on the cable ends prepared in a conventional manner, e.g. over a completed cable connection, the component is usually pulled by hand over the cable connection or cable end region, requiring a great exertion of force. In order to ensure that the cable connection, including the cable ends on both sides and the regions where the cable exits the cable sleeve, is sealed reliably, the inner diameter of the sleeve-shaped component in its relaxed state must be sufficiently smaller than the smallest outer diameter of the cable connection or cable end to be enclosed.

A potential problem, however, exists in that the prepared cable wire connections and the conductor cross sections can be very different in thickness and outer diameter, respectively. In order to ensure a tight enclosure with sufficient tension even at the thinnest regions at the ends of the cable wire connection and the conductor cross section, the sleeve-shaped component must be so dimensioned as to provide a sufficient enveloping force in the relaxed state also in these thin regions. Since the sleeve-shaped components are available with graduated dimensional sizes, it may happen that such a component is not wide enough even in the stretched state in order to allow easy sliding over the prepared cable connection; In these situations, which are typically carried out manually, the assembler is required to apply a significant force which increases with increasingly required expansion of the sleeve-shaped component.

The required force is also dependent on the material of which the components that move relative to one another are made from. When cable connections are made using conventional technology, the sleeve-shaped component made from silicone rubber or EPDM is fitted over the cable insulation made of polyethylene; This has frequently proven to be difficult since silicone tends to "adhere" to polyethylene.

It is known to enable or ease the sliding of the sleeve-shaped component by use of a lubricant, e.g. a lubricating gel or a slip sheet. There are, however, limitations to the effectiveness of known lubricants.

It is known from German Pat. Nos. DE 37 15 915 A1 and DE 30 01 158 A1 to place the sleeve-shaped component, before assembly, on a relatively rigid or slightly plastically deformable cylindrical support device which is then pushed together with the sleeve-shaped component on the cable prepared for assembly, at formation of a radial spacing therebetween. The support device, such as a helical support or a single-part or multi-part support sleeve, is removed after the component is in place. This procedure is however disadvantageous in view of the considerable demand of material and high costs for the support device and the considerable, and in the one case also extended expansion of the sleeve-shaped components of the cable fitting over the entire storage period. Expansion of sometimes more than 300% can lead during this long storage period to the formation of cracks or to material fatigue, thereby preventing reliable insulation and sealing. Since storage periods are typically up to 3 years, the unavoidable material fatigue reduces after relaxation the remaining contact pressure upon the cable and wire insulation. As a result, insufficient insulation can be experienced, leading to partial discharge between the cable and wire insulation and the inner surface of the sleeve-shaped insulating component of the cable fitting; This, however, has to be prevented for reasons of operational safety.

International patent specification WO 89/00782 A1 discloses a method which suggests to use slide rails in parallel and lateral contacting disposition for insertion into a sleeve, with the slide rails having narrow sides provided with longitudinally extending profiles which engage in form-fitting manner with one another, thereby forming a closed annular jacket-like cylindrical structure to effect reduced friction and facilitate a mounting thereof. A drawback however is that the diameter of the jacket-like structure is determined by the number and dimensions of the slide rails so that differences in the diameter e.g. smaller diameters can only be accommodated by the jacket-like structure through an undesirable overlap of these rails.

SUMMARY OF THE INVENTION

With the foregoing shortcomings in mind, it is the object of the invention to provide a method, and a device for carrying out the method, overcoming the known problems associated with fitting the sleeve-shaped components and positioning the sleeve-shaped components of a highly-elastic material on cylindrical or conical base bodies having an outer diameter which is greater than the inner diameter of these sleeve-shaped components in their relaxed state. This is attained by inserting, immediately before the sleeve-shaped component is to be placed over the base body, between the base body and the approximately cylindrical inside wall of the component, a plurality of elongated, thin, flexible rib-like sliding tongues which are spaced apart about the circumference at a slight lateral distance therebetween, and upon which the expanding component is slidingly fitted at very little applied force on the base body until reaching the proper position, whereafter the sliding tongues can be withdrawn for their removal.

The method can be carried out by placing the sliding tongues around the circumference of the cable wire connection forming the base body, with the ends of the sliding tongues pushed together to form a bundle with a smaller diameter, and by sliding and subsequently pushing the sleeve-shaped component over the bundle with very little applied force until it reaches its final position, whereafter the sliding tongues are pulled out for removal.

In a modification of the invention, it is also feasible to insert the sliding tongues arranged about the circumference in the substantially cylindrical inside wall of the sleeve-shaped component in such a way that they abut the wall and freely protrude from at least one end, before the end is slidingly pushed on the base body which is then surrounded on all sides by the spread-apart sliding tongues, until reaching the final position, whereafter the sliding tongues are pulled out for removal.

According to another feature, the sliding tongues can be held at a fixed distance from each other by means of at least one transverse band at least one location along their longitudinal extension at least during the sliding process. Moreover, the sliding tongues according to the invention can be connected at one end of their longitudinal extension by a transverse band at least during the sliding process, and secured in place at a mutual distance therebetween.

The invention further includes a device for sliding and positioning sleeve-shaped, elastic components on cylindrical or conical base bodies having an outer diameter which is greater than the inner diameter of these sleeve-shaped, radially expandable components in relaxed state and made from a highly elastic material, in particular designed as a sliding sleeve for carrying out the method described above, wherein the device has a transverse band for connecting a plurality of mutually laterally spaced-apart, elongated, thin, flexible rib-like sliding tongues made from a material which has a high sliding capability compared to the material of the base body.

According to the invention, the sliding tongues have preferably a width between 3 and 15 mm and a thickness between 0.1 and 4 mm, whereby their free ends may be rounded off.

According to another feature, the transverse band forming the spacer or partial collar can have the form of a closed ring with an inner diameter which is greater than the respective greatest outer diameter of the base body to be enveloped. In accordance with the invention, the sliding tongues extend coaxially with the center axis of the closed ring or are so adapted as to allow bending in this pattern, either in only one direction or in both directions.

According to further features, the ends of the sliding tongues can be connected to a second transverse band or to a second closed ring.

Moreover, a further proposal includes the provision of each of the sliding tongues in the transition area to a respective transverse band with a respective weakening groove, and/or with a predetermined breaking point located halfway between the first and second transverse bands or the respective closed ring, respectively.

The sliding tongues and the associated transverse bands can be fabricated through injection molding from a thermoplastic material, preferably polyethylene or propylene. Preferably, they can also be made from a plate-shaped or extruded, strip-shaped plastic material, preferably polyethylene or propylene, and subsequently mechanically treated, in particular punched and cut.

The use of the sliding sleeve with the afore-mentioned features has many advantages. A mounting of the elastic sleeve-shaped components is thereby significantly facilitated, thus preventing damage, especially overstretching. The new aid can be used over a wide diameter range and can normally be reused several times.

Since the ribs display good sliding capability on the base body, also sleeve-shaped components which are made of silicone rubber or other material displaying poor sliding characteristics and moreover have an inner diameter smaller than the outer diameter of the base body can be fitted over the base body and randomly positioned, without need for great force application and with the necessary expansion. Moreover, also smaller steps and edges can be easily and smoothly passed over, without risk of damaging the inside surface of the sleeve-shaped components.

The sleeve-shaped components are fitted over the ribs only immediately prior to placement over a base body, and radially stretched in a required manner only during the actual mounting process. Consequently, damage to the material due to excess expansion is prevented; On the other hand, great expansion ranges of up to 70% of the required expansion can easily be attained. There is no longer any need for storing the components over longer periods in an expanded state so that material fatigue and possible residual recovery deformation are eliminated.

As soon as the sliding tongues are withdrawn from the sliding sleeve, the sleeve-shaped component collapses at this position of the base body, as intended, to sealingly envelope the latter.

Advantageously, the aggregate width of the individual sliding tongues is smaller than or at most identical to the circumference of the base body with the smallest cross section to be treated. In this way, the sliding tongues can completely lie flat next to each other during placement over the base body even in smallest areas thereof, without adversely affecting in any way the sliding action.

If the sliding sleeve is intended for use with very small cross sections, there is the possibility to leave one or more of the sliding tongues outside the sleeve-shaped component, i.e. they would not be inserted so that the number of effective ribs is reduced. The sliding sleeve according to the invention can thus be suited to completely different situations.

BRIEF DESCRIPTION OF THE DRAWINGS

Exemplified embodiments of the invention with their particulars and features are illustrated in greater detail with reference to the drawing, in which:

FIG. 1a is a perspective view of a first embodiment of a sliding sleeve according to the invention;

FIG. 1b is a perspective view of the process to mount the sleeve-shaped component over a base body by employing the sliding sleeve of FIG. 1a;

DETAILED DESCRIPTION OF PREFERRED EMBODIMENTS

Figure 2:
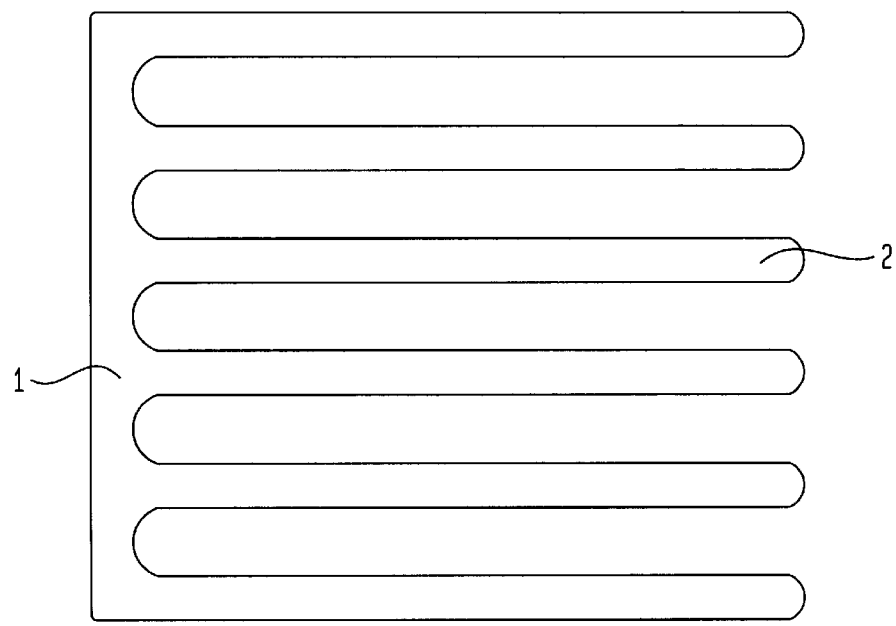
FIG. 2 is a modified second embodiment of a sliding sleeve according to the invention made from plate-shaped material.

As shown in FIG. 1a, the sliding sleeve of the invention is formed from a transverse band 1 in form of a ring-shaped spacer collar or a partial ring collar 24, to which are connected, preferably formed on, several equally spaced, elongated, thin, flexible and rib-like sliding tongues 2 which extend coaxially with the center axis of this closed ring. The free ends of these sliding tongues 2 are preferably rounded off.

The inner diameter of the closed ring 24 is so dimensioned as to fit at a small distance, for example at least 3 mm, over the sleeve-shaped component 8 (see FIG. 1b) enveloping the diameter of the base body 10. When the sliding tongues 2 are initially inserted as a bundle, according to FIG. 2, in the relaxed state in a sleeve-shaped component 8 with the smallest existing diameter and are thereafter, together with the sleeve-shaped component 8, pushed onto a base body 10 with the smallest diameter, the sliding tongues 2 have a lateral spacing sufficient to prevent overlap when they are positioned between the inner circumferential surface of the sleeve-shaped component 8 and the outer circumferential surface of the base body 10.

The sliding sleeve can be designed with graduated sizes and with respectively different numbers and width as well as thickness and length of sliding tongues 2 so that the mode of procedure can also be used for a base body 10 with the largest possible cross section, even if the sleeve-shaped component 8 has to be severely stretched. The inside surface of the sleeve-shaped component 8 is prevented from contacting the surface of the base body 10 between the sliding tongues 2 when selecting a sufficient number of sufficiently wide sliding tongues 2 of the sliding sleeve. The sliding tongues 2 must be chosen to be significantly longer than the greatest length of the sleeve-shaped components 8 to be mounted. In this case, a sleeve-shaped component 8 of this type can, if necessary, be pushed lengthwise over the sliding tongues 2 either over its entire length or only partially.

The sliding sleeve 1 according to the invention is preferably made in one piece through injection molding from a thermoplastic material, e.g. polyethylene or propylene. The plastic should exhibit good sliding capability with respect to the base body.

Figure 4:
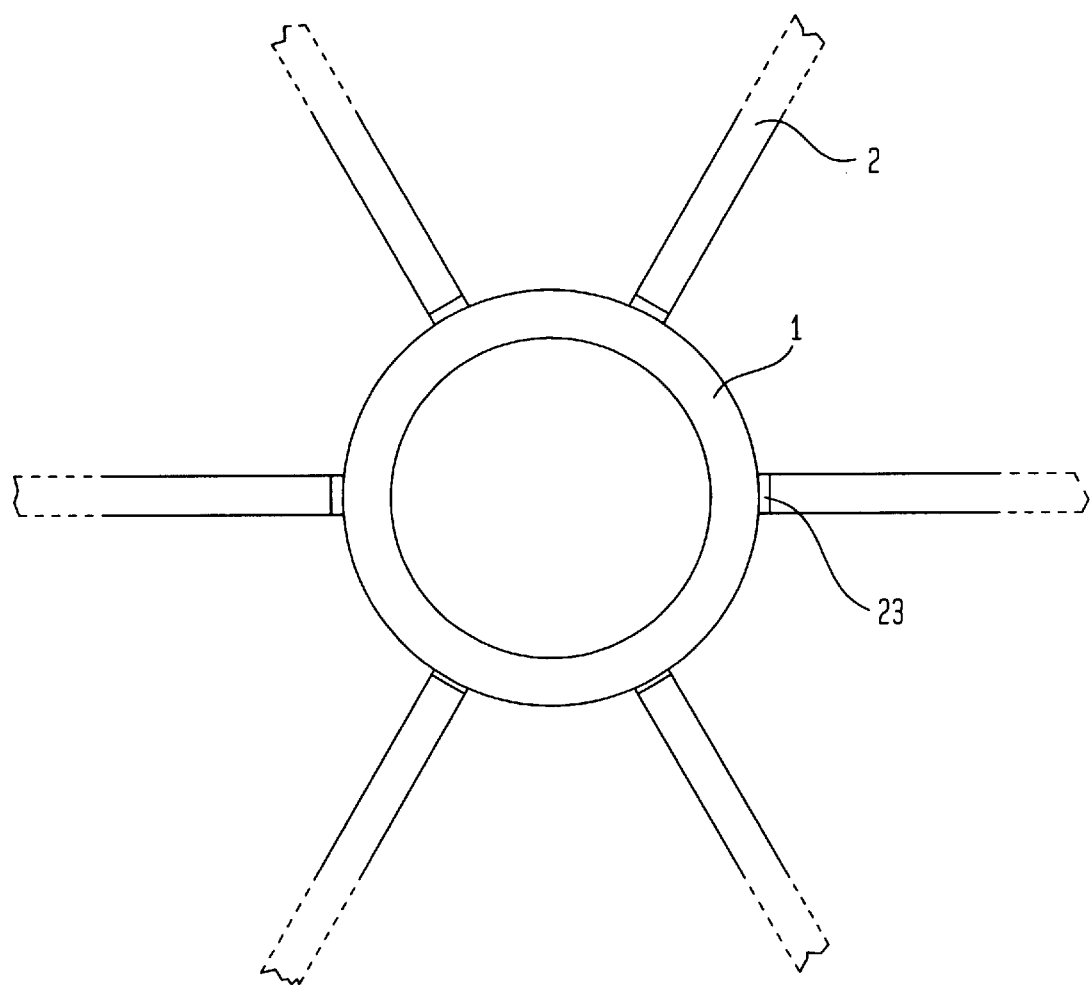
FIG. 4 shows another embodiment of a sliding sleeve according to the invention.

The sliding sleeve 1 may also be made mechanically from a plate-shaped material or from an extruded band, e.g. by punching or cutting. As illustrated in FIG. 4, the sliding tongues 2 can e.g. initially extend radially outwardly in a star pattern from the transverse band 1 which forms a closed ring 24. Prior to the intended application, the sliding tongues 2 are bent about an angle of 90° in coaxial direction, so that they can be inserted with their free ends into the sleeve-shaped component 8. In this case, bending of the ribs 2 can be facilitated by incorporating a weakening groove 23 in the transition region between the spacer collar 1 and the ribs 2.

When punching the sliding aid from a plate-shaped workpiece, the transverse band 1 can be formed of flat configuration rather than as a ring, with the sliding tongues 2 then extending perpendicular to the transverse band 1. For application, the flat structure is then shaped to a ring to form the sliding sleeve.

As discussed above, the sliding sleeve 1 for carrying out the method of the invention is depicted in FIG. 1b, with the base body 10 being illustrated, by way of example, schematically in the form of a cable connector or as the end of a plastic-insulated medium-voltage power cable prepared as a cable termination. The stripped end of the electric conductor is designated by reference numeral 5, with the wire insulation 7 which is stripped to an edge 6, continuing in the form of a cylindrical body. Further set back from the cable end is the outer conductor layer 9. The ends of the shield wires 3 of the cable shielding 4, which are bent backwards and provided with a sealant, form a step 11. Not shown is the equally stepped transition to the outer cable insulation.

The radially expandable sleeve-shaped component 8 which forms part of a cable fitting set and which is made e.g. of silicone rubber or EPDM, is to be mounted onto the cable end, whereby the edge 6 of the wire insulation 7 as well as the step 11 of the shield wires 3 must be overcome, with each having an outer diameter which is greater than the inner diameter of the sleeve-shaped component 8.

The manner of attachment is carried out by initially inserting the free ends of the sliding tongues 2 of the sliding sleeve according to the invention through the sleeve-shaped component 8. Thereafter, the elastically expandable sleeve-shaped component 8 is mounted together with the sliding sleeve 1 over the prepared cable end, with the sliding tongues 2 made e.g. of polyethylene being disposed between the sleeve-shaped component 8 and the cable end forming the base body 10 and so positioned as to be without mutual overlap. As a result of their sliding capabilities, the sliding tongues 2 make it easier for the sleeve-shaped component to slide onto the cable insulation which is also made of polyethylene because polyethylene slides rather well on polyethylene. In this manner, the use of the sliding sleeve enables the sliding tongues 2 to overcome and slide smoothly over the edge 6 and also over the step 11. A crucial advantage thereby is the elimination of any risk of damage to the inside surface of the sleeve-shaped component 8 e.g. by the shield wires 3 at the step 11.

The sleeve-shaped component 8 can now be positioned at any location, whereby the base body 10 may be provided as aid with a marking. In the example illustrated in FIG. 1b, a field control element in the form of a sleeve-shaped component 8 is disposed in its end position over the edge 12 of the outer conduction layer 9. Subsequently, the flexible sliding tongues 2 of the sliding sleeve are sequentially pulled out of the space between the component 8 and the cable wire in direction towards the transverse band 1, with the component 8 now capable of enveloping in correct disposition the cable fitting in a sealed and insulated manner. Thereafter, the sliding sleeve is removed and may be reused for mounting further components, e.g. insulating shields made from silicone rubber.

The method according to the invention employing the sliding sleeve significantly facilitates the attachment of sleeve-shaped components on cylindrical base bodies, without any need for normally used viscous lubricants. In addition, the final removal of the sliding tongues 2 from the space between the base body 10 and the sleeve-shaped component 8 can be effected without any appreciable force.

The novel method is not application-specific. In the event, the diameter of the base body is so small that the sliding tongues 2 overlap when they are inserted between the selected sleeve-shaped component 8 and the base body 10, thereby preventing one or several ribs 2 from failing to be inserted into the sleeve-shaped component 8.

If, on the other hand, base bodies 10 with particularly great diameters are to be enveloped with a sleeve-shaped component, and a sliding sleeve 1 with suitable dimensions is not available, then an embodiment illustrated in FIG. 2 can be used, or a sliding sleeve of the type illustrated in FIG. 1a with a ring shaped transverse band 1 can be cut. In both cases, the sliding sleeve can be used for great diameters and the method can be carried out.

Figure 3:
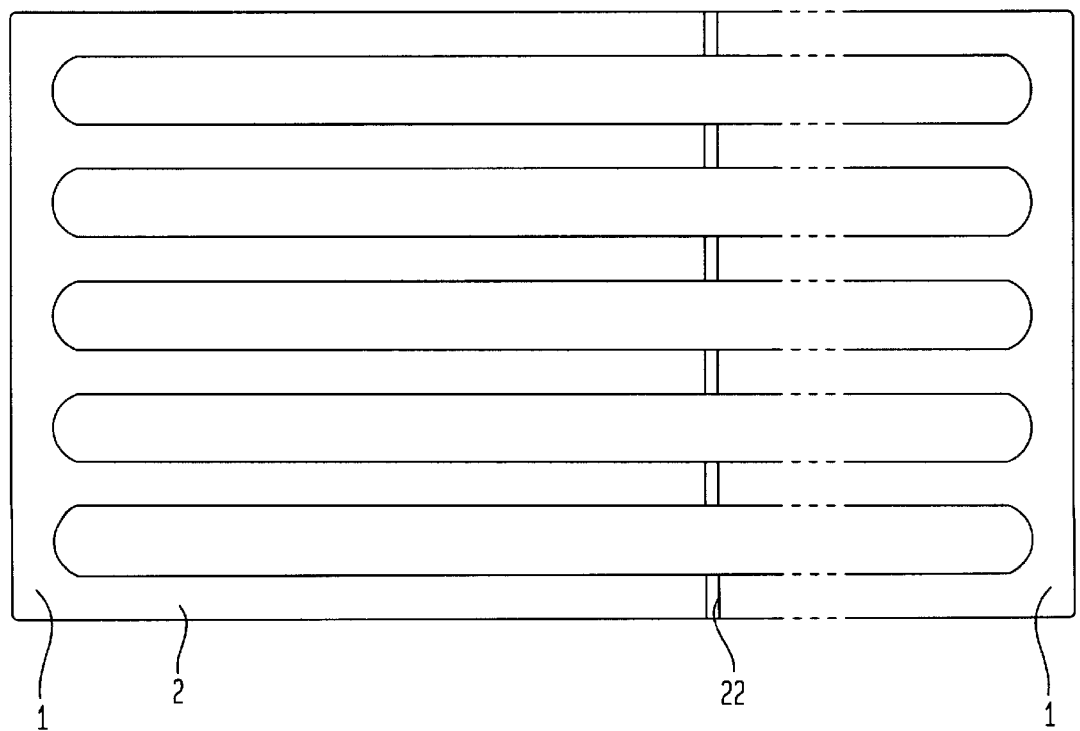
FIG. 3 is a further development of the embodiment of FIG. 2.

Moreover, the method according to the invention also includes an embodiment, employing a sliding sleeve designed according to FIG. 3 and essentially constituting a quasi mirror image of FIG. 2. A transverse band 1, 21 is connected to each end of the sliding tongues 2. At approximately midway of its length, the sliding tongues 2 are provided with a predetermined breaking point 22. One of the transverse bands 1 can be formed to such an extent into a round body that a sleeve-shaped component 8 can be fitted over. This embodiment is recommended for particularly long base bodies 10 and sleeve-shaped components 8 when the contact pressure is very high so that fitting may be impeded. In such a case, it may be advantageous to provide an additional support for the sliding tongues 2. After both the sliding sleeve and the sleeve-shaped component 8 are positioned properly over the base body 10, the sliding sleeve is pulled out to both sides, whereby the sliding tongues 2 separate easily at their respectively provided predetermined breaking points 22.

Although the sliding method according to the invention, employing the sliding sleeve as a device, has been described by way of example in the field of cable connection technology, it should not be restricted thereto. The method can be employed with all applications concerned with mounting elastically expandable enveloping bodies on base bodies, e.g. mounting of sealing collars on cylindrical or substantially cylindrical machine parts.

What is claimed is:

1. A device for sliding a sleeve-shaped elastically expandable structure over a base body having an outer diameter which exceeds an outer diameter of the structure in a relaxed state, the device comprising a one-piece sliding sleeve including a ring-shaped first collar; and a plurality of sliding tongues extending out from the collar, said sliding tongues having flexible characteristics to permit insertion in the structure and subsequent placement of the structure over the base body, and to permit successive withdrawal of the sliding tongues from the structure without the use of any additional actuating means integrally attached to the collar after the structure is positioned by means of the sliding sleeve over the base body, said sliding tongues being so closely spaced from one another as to ensure separation of the structure from the base body when the sliding sleeve is pushed over the base body to prevent damage to the structure, said sliding tongues being made from a material having high sliding capability compared to the material of the base body.

2. The device of claim 1 wherein the sliding tongues have a width between 3 and 5 mm and a thickness between 0.1 and 4 mm.

3. The device of claim 1 wherein the sliding tongues extend from the collar coaxially with the center axis of the collar in at least one of the two coaxial directions.

4. The device of claim 1 wherein an inner diameter of the collar is greater than a respective greatest outer diameter of the base body to be enveloped.

5. The device of claim 1, further comprising a second collar which is spaced apart from the first collar and connected to the sliding tongues.

6. The device of claim 5 wherein between the first collar and the second collar the sliding tongues are provided with a predetermined breaking point.

7. The device of claim 6 wherein the predetermined breaking point is a weakening groove.

8. The device of claim 1 wherein the sliding tongues and the collar are made from a plastic material.

9. The device of claim 8 wherein the plastic material is polyethylene.

10. The device of claim 8 wherein the plastic material is a thermoplastic material and the sliding tongues and the collar are made by injection molding.

11. The device of claim 1 wherein the collar and the sliding tongues connected to the collar are made as one piece from a plate-shaped material through a mechanical treatment and wherein the sliding tongues are angled in a direction approximately perpendicular to the direction of the plate-shaped material in at least one perpendicular direction.

12. The device of claim 11 wherein the mechanical treatment comprises at least one of punching or cutting.

13. The device of claim 1 wherein the collar and the sliding tongues connected to the collar are made as one piece from an extruded band of plastic material.

14. The device of claim 13 wherein the plastic material comprises a material selected from the group consisting of polyethylene and propylene.

\* \* \* \* \*